US010371827B2

(12) United States Patent
Xie et al.

(10) Patent No.: US 10,371,827 B2
(45) Date of Patent: Aug. 6, 2019

(54) METHOD AND SYSTEM FOR RECOVERING SCINTILLATION PULSE INFORMATION

(71) Applicant: RAYCAN TECHNOLOGY CO., LTD. (SU ZHOU), Suzhou New District, Suzhou, Jiangsu (CN)

(72) Inventors: Qingguo Xie, Jiangsu (CN); Zhenzhou Deng, Jiangsu (CN)

(73) Assignee: Raycan Technology Co., Ltd.(Suzhou), Suzhou, Jiangsu (CN)

(*) Notice: Subject to any disclaimer, the term of this patent is extended or adjusted under 35 U.S.C. 154(b) by 246 days.

(21) Appl. No.: 15/037,660

(22) PCT Filed: Dec. 25, 2013

(86) PCT No.: PCT/CN2013/090389
§ 371 (c)(1),
(2) Date: May 18, 2016

(87) PCT Pub. No.: WO2015/074312
PCT Pub. Date: May 28, 2015

(65) Prior Publication Data
US 2016/0291167 A1 Oct. 6, 2016

(30) Foreign Application Priority Data

Nov. 19, 2013 (CN) .......................... 2013 1 0585902

(51) Int. Cl.
*G01T 1/20* (2006.01)
*G01T 1/29* (2006.01)
*G01T 1/36* (2006.01)

(52) U.S. Cl.
CPC .............. *G01T 1/20* (2013.01); *G01T 1/2985* (2013.01); *G01T 1/362* (2013.01)

(58) Field of Classification Search
CPC .................................... G01T 3/06; G01D 1/04
See application file for complete search history.

(56) References Cited

U.S. PATENT DOCUMENTS 6,392,236 B1 * 5/2002 Maekawa ............. G01T 1/2008
250/369
8,446,308 B2   5/2013 Burr et al.
(Continued)

FOREIGN PATENT DOCUMENTS

| CN | 101978289 A | 2/2011 |
| CN | 102073059 A | 5/2011 |
| CN | 102262238 A | 11/2011 |
| JP | 2012-225926 A | 11/2012 |

OTHER PUBLICATIONS

Office Action dated Nov. 23, 2016 in corresponding CN Application No. 201310585902.1.
(Continued)

*Primary Examiner* — Mohamed Charioui
(74) *Attorney, Agent, or Firm* — Knobbe, Martens, Olson & Bear, LLP

(57) ABSTRACT

A method for recovering scintillation pulse information. The method comprises the steps: obtaining a scintillation pulse database of unstacked compliance single-events in a low count, and establishing a noise model of a scintillation pulse for the scintillation pulse database of the single-events; calculating a posterior probability logarithm value of a specific energy value according to the noise model of the scintillation pulse; and repeatedly calling the second step by means of calculations, and obtaining an energy value meeting a maximum posterior probability condition. A system for recovering scintillation pulse information. The system comprises a fluctuation model module, a posterior probability module, and an energy value search module. The method and system for recovering scintillation pulse information in the present invention effectively improve the precision of a system energy calculation, and is specifically suitable for an energy calculation of a sparse quantization level ADC digital nuclear instrument.

10 Claims, 9 Drawing Sheets

(56) References Cited

U.S. PATENT DOCUMENTS

| | | | |
|---|---|---|---|
| 2002/0121603 A1* | 9/2002 | Wong | G01T 1/1642 250/363.09 |
| 2003/0033097 A1* | 2/2003 | Tanaka | G01D 1/04 702/60 |
| 2010/0294943 A1* | 11/2010 | Frank | G01T 3/06 250/367 |
| 2011/0017918 A1 | 1/2011 | Baeumer et al. | |
| 2014/0052414 A1 | 2/2014 | Xie et al. | |

OTHER PUBLICATIONS

Office Action dated Jul. 3, 2017 in corresponding JP Application No. 2012225926A.

Long et al, Energy calibration based on PET singles list mode data , Progress Report on China Nuclear Science & Technology, vol. 2, Oct. 2011. pp. 138-141.

Extended European Search Report dated Jun. 14, 2017 in corresponding EP Application No. 13897953.9.

Deng et al., Scintillation event energy measurement via a pulse model based iterative deconvolution method Physics in Medicine and Biology, Institute of Physicals Publishing, vol. 58, No. 21, Oct. 21, 2013, pp. 7815-7827.

Deng, Zhenzhou et al. 'Emperical Bayesian Energy Estimation for Multi-Voltage Threshold Digitizer in PET' IEEE, Nov. 2, 2013.

Wong et al. "A Scintillation Detector Signal Processing Technique with Active Pileup Prevention for Extending Scintillation Count Rates" IEEE Transactions on Nuclear Science, vol. 45, No. 3, Jun. 1998, pp. 838-842.

\* cited by examiner

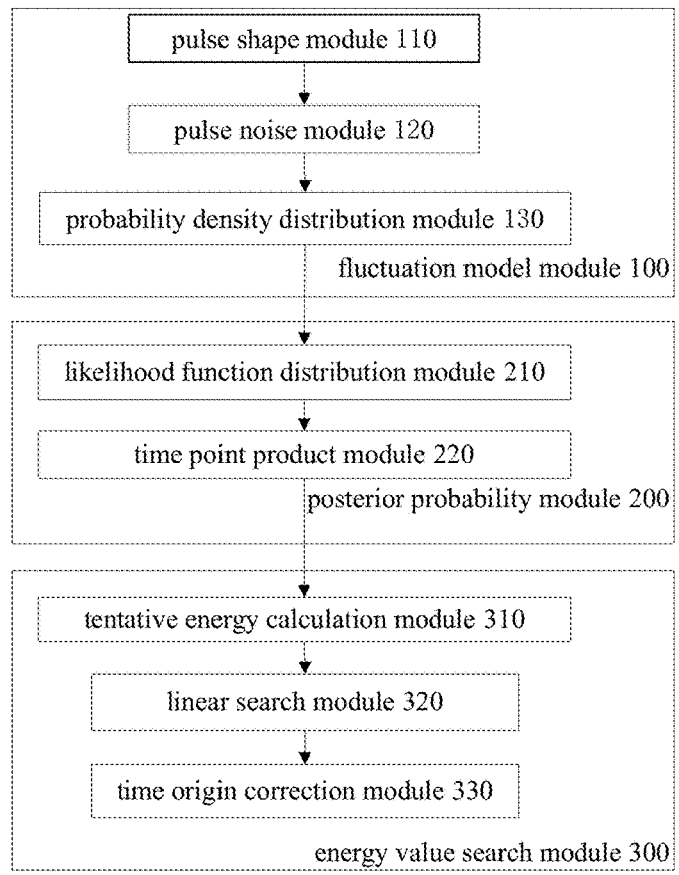

Figure 1 acquire a scintillation pulse database of non-stacked compliance single events in a low count, and build a scintillation pulse noise model for the scintillation pulse database of the single events, where an average pulse is calculated for the scintillation pulse database of the non-stacked compliance single events, and scintillation pulse shape information is given by the average pulse calculate a posterior probability logarithm value for a given energy value based on the scintillation pulse noise model calculate an energy value meeting a maximal posterior probability condition by repeatedly performing step S2

METHOD AND SYSTEM FOR RECOVERING SCINTILLATION PULSE INFORMATION

This application is the national phase of International Application No. PCT/CN2013/090389, titled "METHOD AND SYSTEM FOR RECOVERING SCINTILLATION PULSE INFORMATION", filed on Dec. 25, 2013, which claims priority to Chinese Patent Application No. 201310585902.1, entitled "METHOD AND SYSTEM FOR RECOVERING SCINTILLATION PULSE INFORMATION", filed with the Chinese State Intellectual Property Office on Nov. 19, 2013, both of which are incorporated by reference in entirety herein.

FIELD

The present disclosure relates to the field of digital signal processing, photoelectric signal processing and radiation detection, and in particular to a method and a system for recovering scintillation pulse information.

BACKGROUND

In the nuclear analysis field including positron lifetime spectrometers and positron angle-momentum association analyzers, in the nuclear detection field including double-compliance energetic particle discriminators and in the medical imaging field including the Positron Emission Tomography (abbreviated as PET hereinafter), a main working principle of detecting energetic particles is to convert a high-energy ray into an electric signal and then obtain various information of a particle event with a method of the fast electronics. In some applications of meters involving coincidence logical operations and time stamps, shaping a scintillation pulse, which slows down the process, may affect a time performance of the scintillation pulse and may increase a probability of stacking event pulses. In this case, it is more desirable to directly digitize the scintillation pulse.

In a complete digitization of a scintillation pulse, an Analog to Digital Converter (abbreviated as ADC hereinafter) with a high bandwidth and a high sampling rate is adopted to directly sample and quantize the scintillation pulse. Such digitization method cannot meet an actual requirement of multi-channel systems due to a high cost. And the above digitization solution may be simplified in two manners to reduce the cost. In one manner, the sampling rate is reduced. In this case, due to a low sampling frequency, a high-frequency component of a non-shaped scintillation pulse signal not only cannot be sampled, but also affects accuracy of a component around a Nyquist frequency due to aliasing in the frequency domain. In order to alleviate the above defect, a shaping process is added between a process of outputting the scintillation pulse and a process of digitizing the scintillation pulse. In the shaping process, a component of the scintillation pulse having a frequency higher than the Nyquist frequency is attenuated and a low-frequency component of the scintillation pulse is reserved, to reduce the aliasing in frequencies due to the digitizing of the scintillation pulse. However, it is impossible to sample a component having a frequency higher than the Nyquist frequency due to a limitation by the Nyquist frequency itself.

Besides the manner in which the ADC is simplified in the time axis, in another manner, the ADC is simplified in the voltage axis. An effective bandwidth of the ADC simplified in the voltage axis may be improved by using an open-loop designation, which is favorable to a high-speed signal processing. For example, a digitization method involving several comparators/ADC units and an ADC with interleaving open-circuit time all perform in this manner. Such ADC is characterized by a high sampling rate and a high bandwidth but a limited quantization accuracy. Since the scintillation pulse has distinctive priori knowledge, with which the accuracy of recovering a digitalized signal may be improved and a quantization level may be set optimally.

Therefore, for the above sparse quantization level ADC, it is desired to provide a new method and a new system for recovering scintillation pulse information to address issues existing in the conventional technology.

SUMMARY

In view of the above, an object of the present disclosure is to provide a method and a system for recovering scintillation pulse information, to recover a digitized signal more accurately and to acquire more event information by optimizing a setting of quantization levels.

In order to achieve the above object, the following technical solutions are provided according to the present disclosure.

A method for recovering scintillation pulse information includes:
  step S1: acquiring a scintillation pulse database of non-stacked compliance single events in a low count, and building a scintillation pulse noise model for the scintillation pulse database of the single events, where an average pulse is calculated for the scintillation pulse database of the non-stacked compliance single events, and scintillation pulse shape information is given by the average pulse;
  step S2: calculating a posterior probability logarithm value for a given energy value based on the scintillation pulse noise model, including:
    step 2.1: loading a scintillation pulse segment $S_0$, and calculating a likelihood function of the given energy value based on the pulse noise model, where the scintillation pulse segment starts at a time point $t_0$ at which the scintillation pulse segment passes upwards a threshold $v_1$ and the scintillation pulse segment ends at a time point $t_0 + \Delta t$, with $\Delta t$ being greater than two times of a time constant of a falling edge of a scintillation crystal; and
    step 2.2: calculating logarithms for all of the time points and adding up the logarithms, to obtain a value of a function having same monotonicity as a posterior probability function; and
  step S3: performing step S2 repeatedly to obtain an energy value meeting a maximal posterior probability condition, including:
    step 3.1: calculating posterior probabilities for different tentative energy values by repeatedly performing step S2 as a module;
    step 3.2: searching linearly for the energy value meeting the maximal posterior probability condition; and
    step 3.3: after the energy value is obtained, correcting a time origin for step 2.1 based on the energy value and repeating step 3.1 and step 3.2.

Preferably, in the above method for recovering scintillation pulse information, the scintillation pulse database in step S1 may include 2000 or more samples.

Preferably, in the above method for recovering scintillation pulse information, the scintillation pulse noise model in step S1 may include characteristics of a scintillation pulse shape, a scintillation pulse height and a scintillation pulse noise level.

Preferably, in the above method for recovering scintillation pulse information, the calculating the average pulse in step S1 may include:

step 1.1: reducing a radiation dose of a radiation source to obtain a weak source, and reducing the number of high-energy photons captured by a detector by the weak source or by adjusting a solid angle of the weak source with respect to the detector, where an event received by the detector is a Poisson stream having an average count rate expressed as $$R = \sum_{i}^{n} a_i m_i q_i \quad (1)$$

where $m_i$ and $q_i$ denote respectively a dose of the weak source and a solid angle of the weak source with respect to the detector, i denotes an index of the weak source, and n denotes the number of weak sources;

step 1.2: aligning the pulses with a constant coefficient identification method or a leading edge discrimination method; and step 1.3: averaging the aligned pulses.

Preferably, in the above method for recovering scintillation pulse information, in step S1, after the pulses are aligned, energy values of scintillation pulses corresponding to a same energy value at a same time point may be distributed dispersedly, the distribution may be defined as a noise model of the pulses, and a parameter of the noise model may be used to calculate a posterior probability value for a given energy value.

Preferably, in the above method for recovering scintillation pulse information, step S1 may further include: setting a couple of compliance pulses selected within an energy range as a couple of single events, and pre-storing and analyzing off-line such digitized electric pulses, where an average pulse signal is obtained by aligning the couple of pulses, and energy spectrums of the single events are obtained by adding up the digitized electric pulses by taking the average pulse as a system response.

A system for recovering scintillation pulse information includes:

a fluctuation model module configured to train pre-acquired data having a low count rate to acquire a fluctuation model of a scintillation detector system, where the fluctuation model represents an average pulse, a noise variance and a noise distribution skewness, and the noise model is provided to the posterior probability module;

a posterior probability module configured to calculate a posterior probability to obtain a posterior probability logarithm value for a given energy value; and an energy value search module configured to search for an energy value meeting a maximal posterior probability condition.

Preferably, in the above system for recovering scintillation pulse information, the fluctuation model module may include:

an average pulse module configured to calculate an average pulse of single events;

a pulse noise module configured to calculate a noise variance of pulses of the single events; and a probability density distribution module configured to estimate a probability density distribution function of noise.

Preferably, in the above system for recovering scintillation pulse information, the posterior probability module may include:

a likelihood function distribution module configured to calculate a likelihood function value of each point based on the given energy value and the pulse noise model input by the fluctuation model module; and a time point product module configured to calculate a posterior probability logarithm value.

Preferably, in the above system for recovering scintillation pulse information, the energy value search module may include:

a tentative energy calculation module configured to calculate a posterior probability logarithm value for a tentative energy value by calling the posterior probability module;

a linear search module configured to calculate an energy value meeting a maximal posterior probability condition with a linear search algorithm; and a time origin correction module configured to correct a time origin for a sample and repeatedly call the tentative energy calculation module and the linear search module.

It can be seen from the above technical solutions that, with the above method and system for recovering scintillation pulse information according to the embodiments of the present disclosure, energy information of the respective single events can be calculated effectively, a count rate of the system in an energy window is increased, and an energy resolution of the system is improved. Therefore, the method and system are especially suitable for processing a scintillation event in an off-line environment.

It can be seen from the above technical solutions that, in the embodiments of the present disclosure, a pulse height or energy information of the scintillation pulse are estimated accurately by calculating parameters of a scintillation event corresponding to a maximal posterior estimation of a given system.

Compared with the conventional technologies, the present disclosure has the following advantages:

(1) a good energy resolution;
(2) a high count rate for a given energy window; and
(3) an ability to avoid quantization error caused by the small number of quantization levels.

BRIEF DESCRIPTION OF THE DRAWINGS

The drawings to be used in the description of the embodiments or the conventional technology will be described briefly in the following, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

FIG. 1 is a structural diagram of a system for recovering scintillation pulse information according to the present disclosure;

FIG. 2 is a flowchart of a method for recovering scintillation pulse information according to the present disclosure;

DETAILED DESCRIPTION OF EMBODIMENTS

Figure 3:
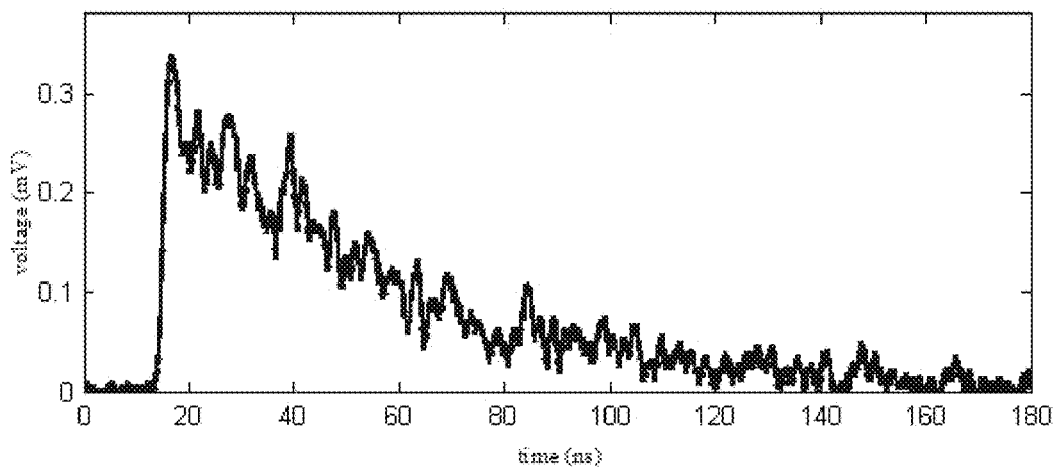
FIG. 3 is a schematic diagram of a typical scintillation pulse.

The present disclosure provides a method and a system for recovering scintillation pulse information. With the method and the system, pulse energy information sampled by a sparse quantization level ADC can be recovered, a height estimation of scintillation pulse can be estimated more accurately and a count rate of the system in an energy window can be increased.

The method for recovering scintillation pulse information according to the present disclosure includes the following step 1 to step 3.

In step 1, a pulse database of non-stacked compliance single events in a low count is acquired, and then a noise model is built for the pulse database of the single events. It is preferable that the pulse database includes more than 2000 samples. The noise model is more accurate with the increasing number of pulses.

In step 2, a posterior probability logarithm value for a given energy value is calculated.

In step 3, an energy value meeting a maximal posterior probability condition is searched for linearly.

The system for recovering scintillation pulse information according to the present disclosure includes a noise model module, a posterior probability module and an energy value search module. The noise model module is configured to obtain a noise model from a single event pulse set, and the other modules are configured to process scintillation pulse signals obtained by a sparse quantization level ADC. The posterior probability module is configured to calculate a posterior probability of an inputted energy value. And the energy value search module is configured to search for an energy value meeting a maximal posterior probability condition.

The technical solution according to the embodiments of the present disclosure will be described clearly and completely as follows in conjunction with the appended drawings. It is apparent that the described embodiments are only a few rather than all of the embodiments according to the present disclosure. Any other embodiments obtained by those skilled in the art based on the embodiments in the present disclosure without any creative work fall in the scope of the present disclosure.

In the method, the energy value meeting the maximal posterior probability condition is obtained based on the Bayes principle.

In the method for recovering scintillation pulse information according to the present disclosure, a noise model is firstly obtained based on a pre-acquired database. The noise model is used as inherent prior knowledge of an electric signal to calculate a posterior probability of a sparsely quantized scintillation pulse. And an energy value meeting a maximal posterior probability condition is searched for linearly by repeatedly calling the posterior probability module.

As shown in FIG. 2, the method for recovering scintillation pulse information according to the present disclosure includes the following steps S1 to S3.

In step S1, a scintillation pulse database of non-stacked compliance single events in a low count is acquired. A scintillation pulse noise model is built for the scintillation pulse database of the single events. An average pulse is calculated for the scintillation pulse database of the non-stacked compliance single events. Scintillation pulse shape information is given based on the average pulse. It is required that the pulse database includes more than 2000 samples. And a statistic noise is smaller with the increasing number of pulses.

The scintillation pulse noise model in step S1 includes characteristics of a scintillation pulse shape, a scintillation pulse height and a scintillation pulse noise level. These characteristics are parameters for calculating a posterior probability of energy of a couple of samples at a single time point, and a posterior probability corresponding to the energy cannot be calculated without values of the above characteristics. The parameters depend on the system. A noise model can be built by those skilled in the art with different methods. Generally, the noise model may be obtained by a simulation or experimental measurement. In a case of the simulation, a distribution of voltage values at different time points of each pulse is given based on an assumption, and the distribution is the noise model. In a case of the experimental measurement, sampled scintillation pulses are aligned, thereby obtaining a distribution of voltage values at each time point (a scintillation pulse noise model).

The average pulse is calculated in step S1 with the following steps S1.1 to S1.3.

In step 1.1, a radiation dose of a radiation source is reduced to obtain a weak source. The number of high-energy photons captured by a detector is reduced by the weak source or by adjusting a solid angle of the weak source with respect to the detector. A probability of stacking is small under an extreme low count rate. An event received by a detector is a Poisson stream having an average count rate expressed as $$R = \sum_{i}^{n} m_i q_i \qquad (1)$$

where $m_i$ denotes a dose of the weak source and $q_i$ denotes the solid angle of the weak source to the detector, i denotes an index of the weak source, and n denotes the number of weak sources. It may be configured that n=1 and m is small enough in acquiring the pulse database.

In step 1.2, the pulses are aligned with a constant coefficient identification method or a leading edge discrimination method.

In step 1.3, the aligned pulses are averaged.

After the pulses are aligned in step S1, energy values of scintillation pulses corresponding to a same energy value at a same time point are distributed dispersedly. The distribution is defined as a noise model of the pulses. A parameter of the noise model is used to calculate a posterior probability value for a given energy value.

Figure 4:
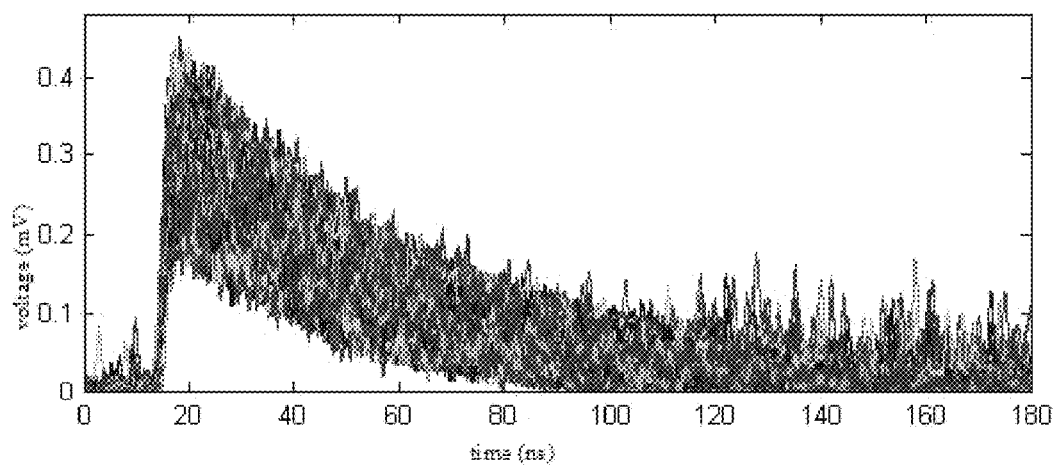
FIG. 4 is a schematic diagram of a set of scintillation pulses having same energy.

Reference is made to FIG. 4, which is a schematic diagram of a set of scintillation pulses having same energy. Step S1 further includes: setting a couple of compliance pulses selected in an energy range as a couple of single events, pre-storing and then analyzing off-line such digitized electric pulses. The couple of pulses are aligned to obtain an average pulse signal and a pulse residual sequence. And an energy spectrum of single event data is obtained by adding up the digital pulses by taking the average pulse as a system response.

Unless specified otherwise, the scintillation pulses according to the present disclosure each have a positive value. The energy spectrum of single event data may be obtained by adding the digital pulses up. If an actually-acquired pulse is a negative pulse, a phase inversion has been performed by default. Therefore, a rising edge of an electric pulse is its leading edge and a falling edge of the electric pulse is its tail portion. All intermediate information obtained in processing an original pulse database may be referred to as a derivative pulse database. And the derivative pulse database may be obtained by performing operations, such as filtering, interpolation, fitting, extrapolation and combination, on the original pulse database.

In step S2, a posterior probability logarithm value for a given energy value is calculated based on the scintillation pulse noise model.

An energy value meeting the maximal posterior probability condition reflects a basic principle in statistics, which is that a probability that a current observation occurs at an energy value is greater than a probability that the observation occurs at other energy values. The probability is calculated by multiplying a prior probability of an energy value by a likelihood probability that an observation occurs at the energy value.

Step S2 includes the following step 2.1 and step 2.2.

In step 2.1, a scintillation pulse segment $S_0$ is loaded, and a likelihood function of the given energy value is calculated based on the noise model of pulse obtained above. The scintillation pulse segment starts at a time point $t_0$ at which the scintillation pulse segment passes upwards a threshold $v_1$, and the scintillation pulse segment ends at a time point $t_0+\Delta t$, with $\Delta t$ being greater than two times of a time constant of a falling edge of a scintillation crystal.

In step 2.2, logarithms for all of the time points are calculated and added up, to obtain a value of a function having same monotonicity as a posterior probability function.

The likelihood function does not need to be directly calculated in an actual calculation, and is obtained by calculating a logarithm value of the likelihood function. The logarithmic likelihood function is equivalent to a sum of logarithm functions of the pulse at individual time points. Since the likelihood function may have other forms, the form of the likelihood function is not fixed.

The time point means an arrival time of the pulse. And the arrival time is considered as a zero point for a time point of the pulse. Since a logarithm of a function has the same monotonicity as the function, the logarithm of the function achieves an extreme value as the function achieves an extreme value. Therefore, maximizing a certain function is equivalent to maximizing a logarithm of the function. Therefore, as performed in step S2, maximizing a logarithm of a posterior probability is equivalent to maximizing the posterior probability.

In step S3, an energy value meeting a maximal posterior probability condition is calculated by repeatedly performing step S2.

In step S3, an energy correction is performed on a time origin of the pulse after each energy calculation. The time points are corrected not only for making the energy value more accurate but also for obtaining more accurate time information. In a PET or a nuclear measurement apparatus, a single event pulse is completely represented with time information and energy information. The shape information is given by the average pulse, and is unnecessary for most of nuclear measurement apparatuses.

Step S3 includes the following step 3.1 to step 3.3.

In step 3.1, step S2 is performed repeatedly as a module, to calculate posterior probabilities corresponding to different tentative energy values.

Figure 16:
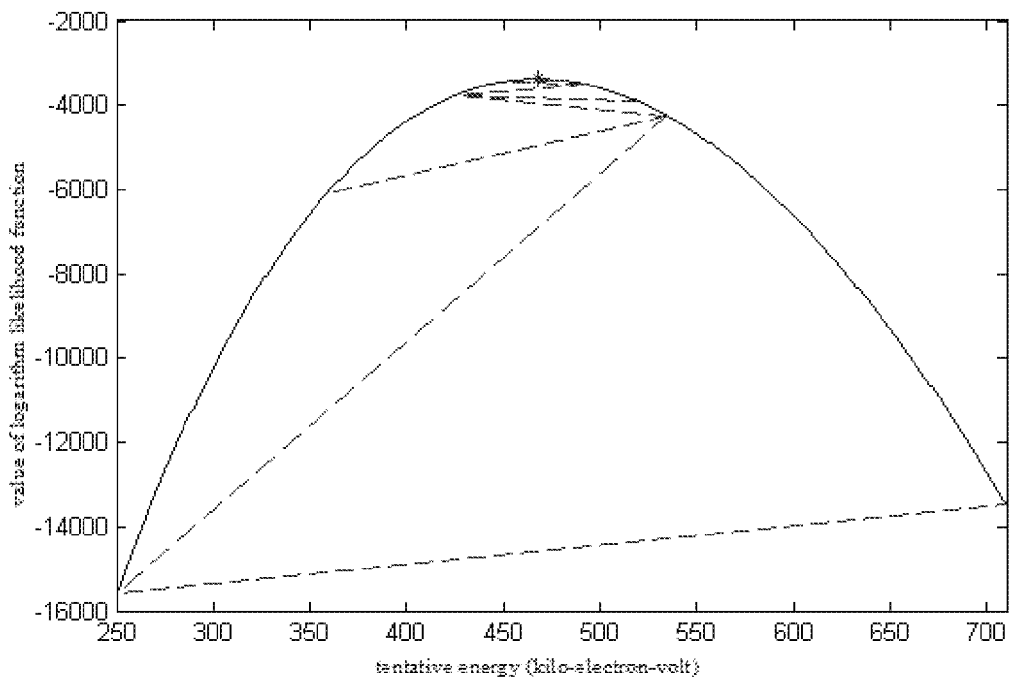
FIG. 16 is a diagram showing a process for searching for an optimal one-dimension solution for an energy value.

In step 3.2, the energy value meeting the maximal posterior probability condition is searched for linearly. Existing linear-search algorithms include a golden section method, a bi-search method, a Fibonacci series method and the like. As shown in FIG. 16, FIG. 16 is a diagram showing a process for searching for an optimal a one-dimension solution for an energy value.

A maximized posterior probability is obtained by multiplying a maximized likelihood function by an energy probability distribution function. And a posterior probability is obtained by multiplying a likelihood function by an energy probability distribution function.

In step 3.3, after the energy value is obtained, the time origin is corrected in step 2.1 based on the energy value, and then step 3.1 and step 3.2 are repeated.

The energy value is calculated based on digitized samples, that is, the measured energy value depends on time. The time is not accurate without being corrected based on the energy value, and a "time walk" phenomenon may occur. Therefore, inaccurate time is corrected after the energy value is obtained. The energy value is calculated again after the time is corrected, and the time is corrected again after the energy value is obtained. An iteration process of time-energy-time-energy is performed to improve the accuracy of the time and the energy measurement. Therefore, the iteration related to time is introduced to improve the accuracy of the measurement.

Reference is made to FIG. 6 to FIG. 11, which are schematic diagrams of energy spectrums obtained by adopting different energy calculation methods in a case of a poor energy resolution or in a case of a good energy resolution. The adopted energy calculation methods include a digital gated integration, a method according to the present disclosure and a least-square fitting algorithm.

Figure 6:
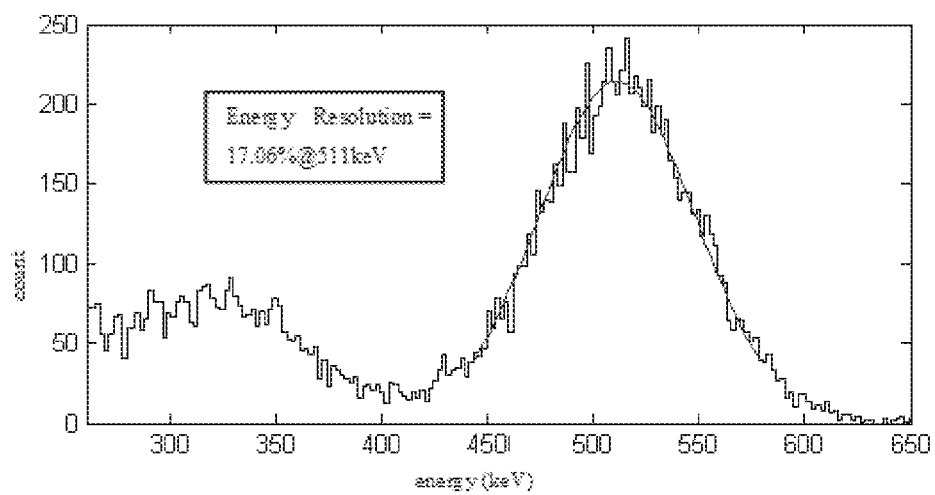
FIG. 6 is a schematic diagram of an energy spectrum in a case of a poor energy resolution, in which energy is calculated with digital gated integration.

FIG. 6 is a schematic diagram of an energy spectrum in a case of a poor energy resolution, in which energy is calculated with the digital gated integration. The energy resolution is calculated by dividing peak position by a peak width (a full width at half maximum). In the gated integration, a gated signal is obtained by a threshold inversion of a rising edge. A pulse is integrated in such gated range, and the obtained integration value is normalized to represent an energy value. The normalization is performed by normalizing a full energy peak with respect to 511 keV (kilo-electronvolt).

Figure 7:
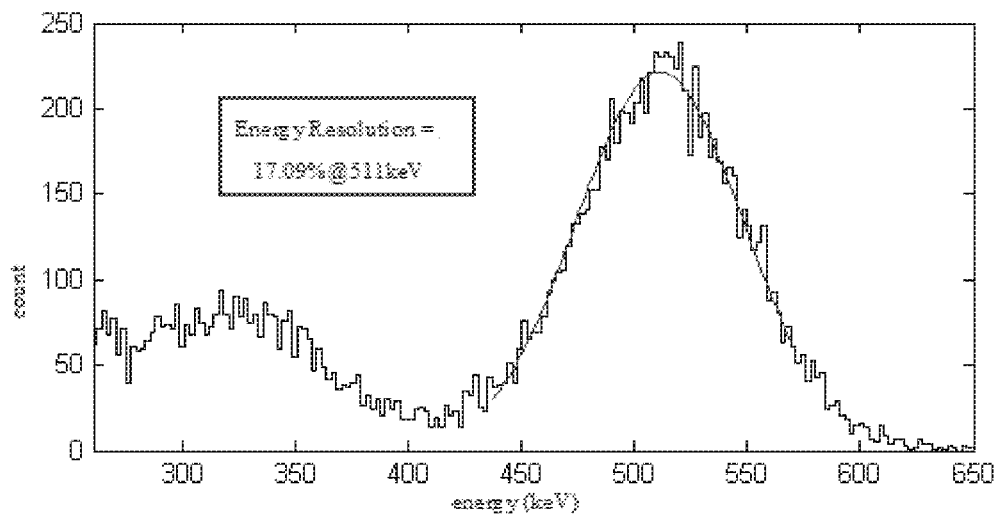
FIG. 7 is a schematic diagram of an energy spectrum in a case of a poor energy resolution, in which energy is calculated with a method according to the present disclosure.

FIG. 7 is a schematic diagram of an energy spectrum in a case of a poor energy resolution, in which energy is calculated with the method according to the present disclosure. And a used method for calculating the energy resolution and a used method for normalization are the same as those shown in FIG. 6.

Figure 8:
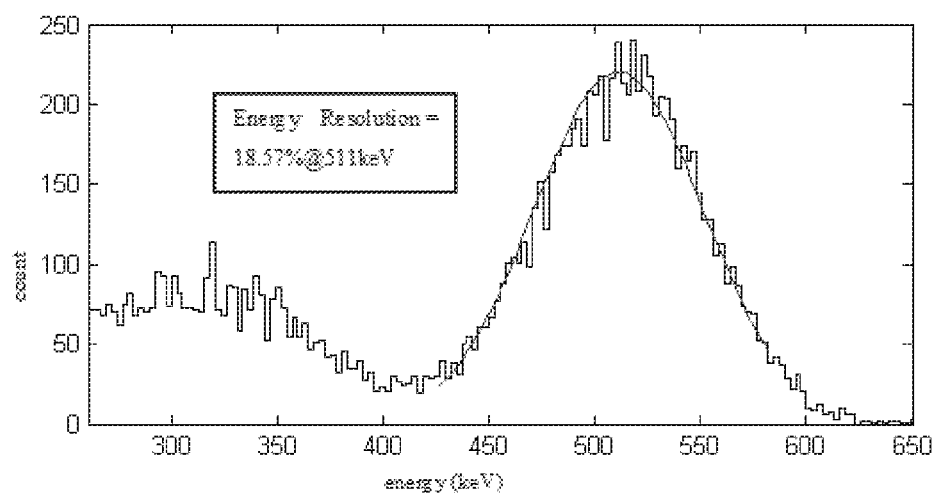
FIG. 8 is a schematic diagram of an energy spectrum in a case of a poor energy resolution, in which energy is calculated with a least-square fitting algorithm.

FIG. 8 is a schematic diagram of an energy spectrum in a case of a poor energy resolution, in which energy is calculated with the least-square fitting algorithm. And a used method for calculating the energy resolution and a used method for normalization are the same as those shown in FIG. 6.

Figure 9:
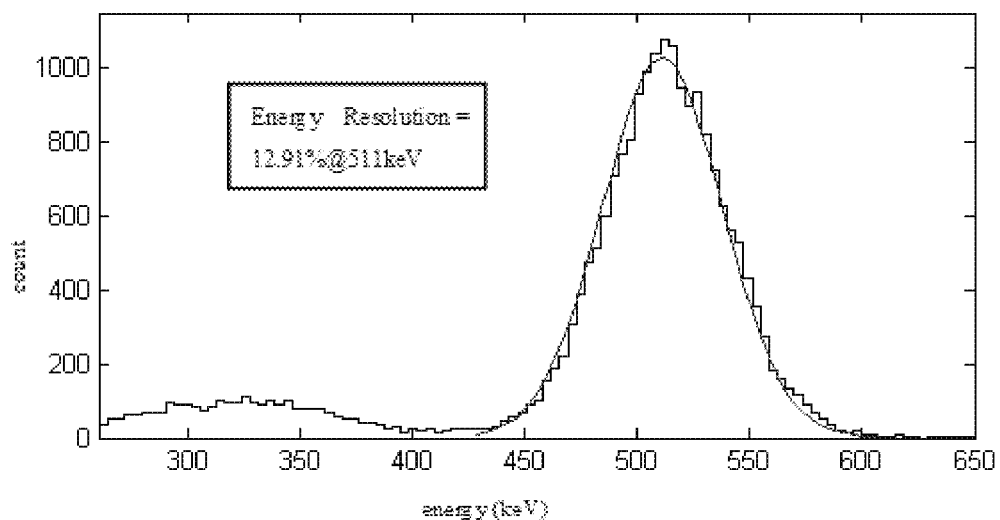
FIG. 9 is a schematic diagram of an energy spectrum in a case of a good energy resolution, in which energy is calculated with digital gated integration.

FIG. 9 is a schematic diagram of an energy spectrum in a case of a good energy resolution, in which energy is calculated with the digital gated integration. And a used method for calculating the energy resolution and a used method for normalization are the same as those shown in FIG. 6.

Figure 10:
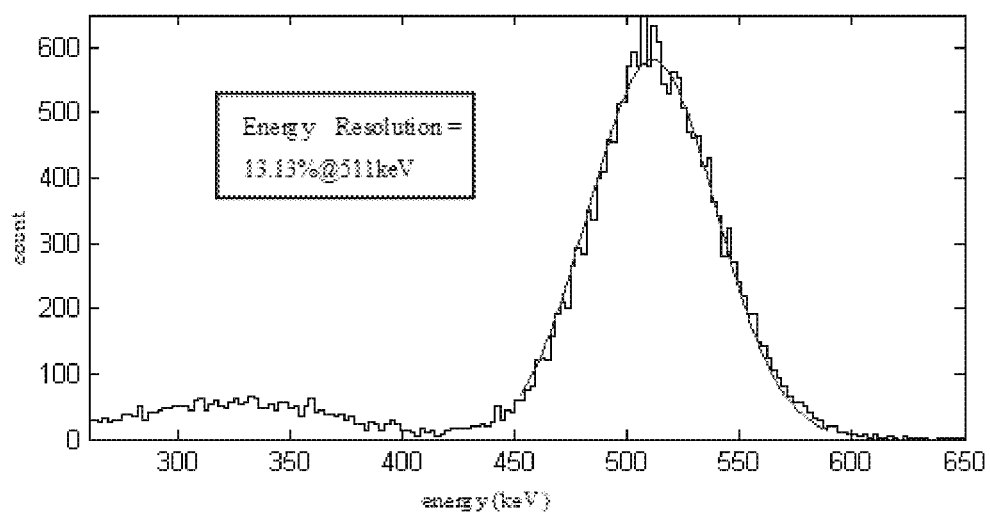
FIG. 10 is a schematic diagram of an energy spectrum in a case of a good energy resolution, in which energy is calculated with a method according to the present disclosure.

FIG. 10 is a schematic diagram of an energy spectrum in a case of a good energy resolution, in which energy is calculated with the method according to the present disclosure. And a used method for calculating the energy resolution and a used method for normalization are the same as those shown in FIG. 6.

Figure 11:
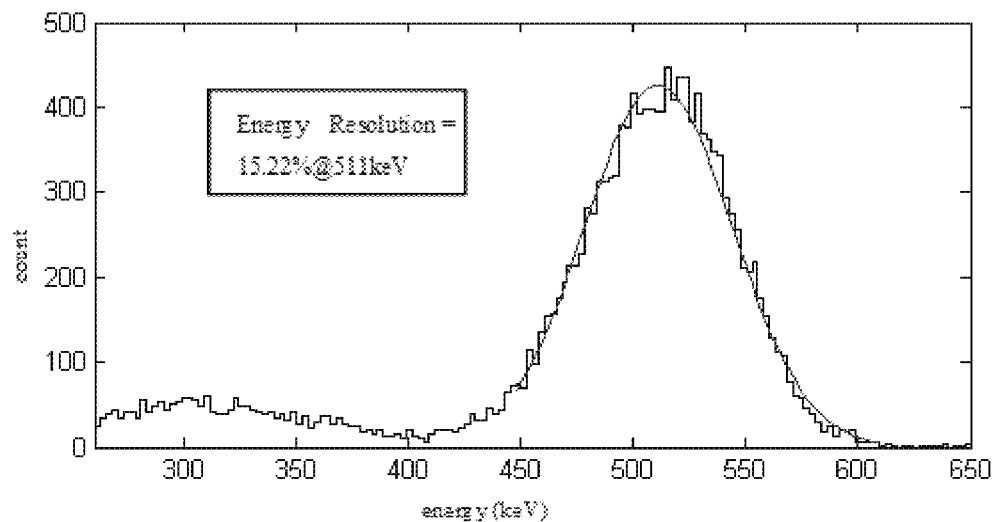
FIG. 11 is a schematic diagram of an energy spectrum in a case of a good energy resolution, in which energy is calculated with a least-square fitting algorithm.

FIG. 11 is a schematic diagram of an energy spectrum in a case of a good energy resolution, in which energy is calculated with the least-square fitting algorithm. And a used method for calculating the energy resolution and a used method for normalization are the same as those shown in FIG. 6.

Reference is made to FIG. 12 to FIG. 15, which are scatter diagrams of energy values obtained by the least-square fitting algorithm vs. energy values obtained by the digital gated integration and scatter diagrams of energy values obtained by the method according to the present disclosure vs. energy values obtained by the digital gated integration.

Figure 12:
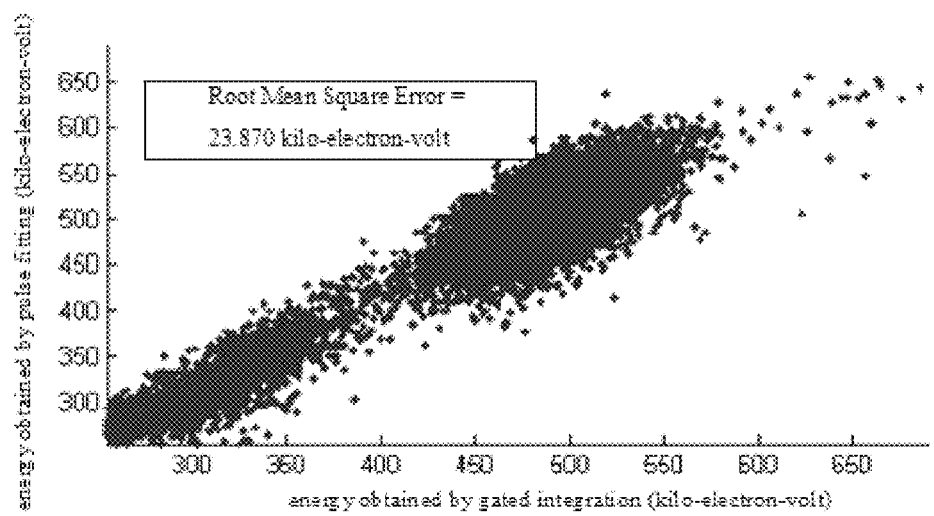
FIG. 12 is a scatter diagram of energy values obtained by a least-square fitting algorithm vs. energy values obtained by digital gated integration, in which the energy values are as shown in FIG. 4.

FIG. 12 is a scatter diagram of energy values obtained by the least-square fitting algorithm vs. energy values obtained by the digital gated integration, and the energy values are as shown in FIG. 4. A horizontal coordinate in the scatter diagram represents an energy value obtained by the gated integration, and a vertical coordinate in the scatter diagram represents an energy value obtained by the pulse fitting. Taking the gated integration as a golden standard, an error level of an energy calculation method with respect to the gated integration may be used to evaluate the accuracy of the energy calculation method. Performances of the respective energy calculation methods may be observed by representing energy accuracy as a Root Mean Square Error (RMSE).

Figure 13:
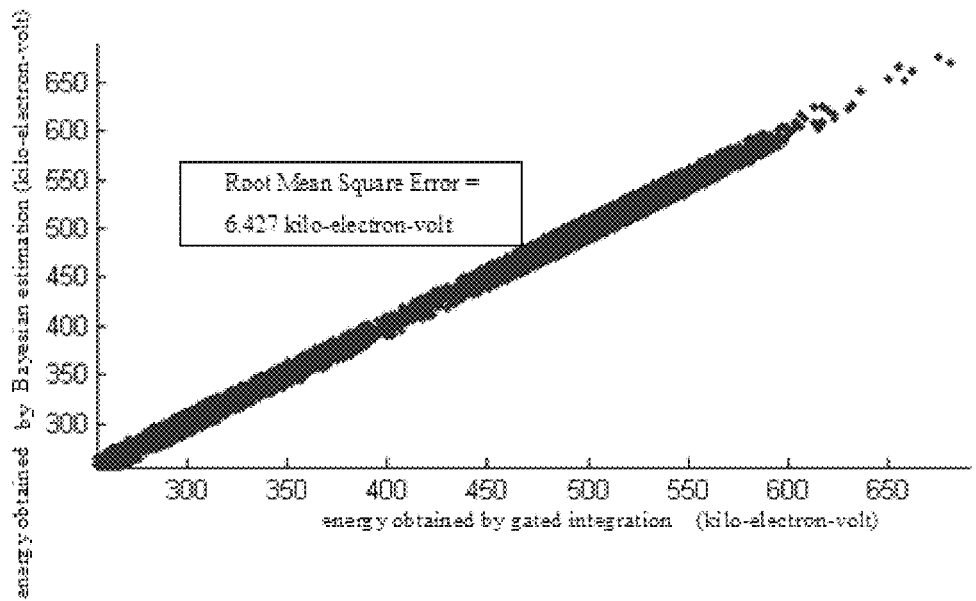
FIG. 13 is a scatter diagram of energy values obtained by a method according to the present disclosure vs. energy values obtained by digital gated integration, in which the energy values are as shown in FIG. 4.

FIG. 13 is a scatter diagram of energy values obtained by the method according to the present disclosure vs. the energy values obtained by the digital gated integration, and the energy values are as shown in FIG. 4. A horizontal coordinate in the scatter diagram represents an energy value obtained by the gated integration, and a vertical coordinate in the scatter diagram represents an energy value obtained by the pulse fitting.

Figure 14:
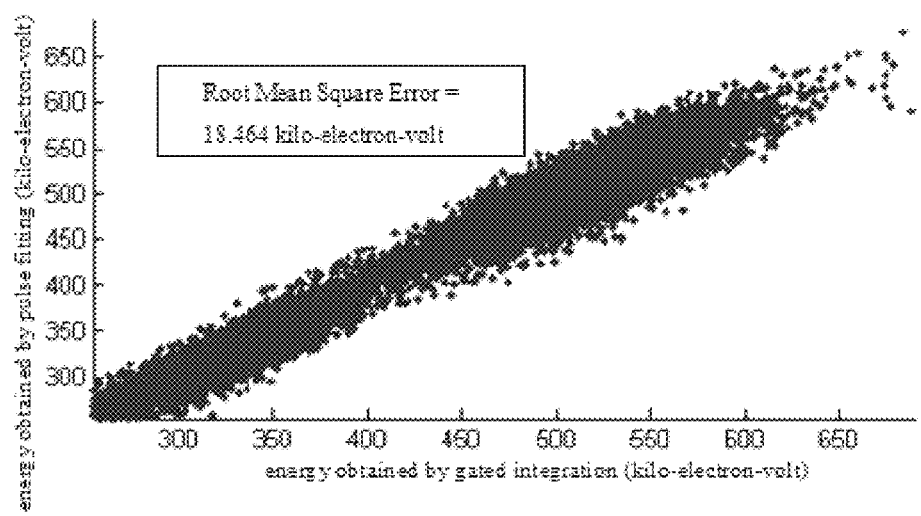
FIG. 14 is a scatter diagram of energy values obtained by a least-square fitting algorithm vs. energy values obtained by digital gated integration, in which the energy values are as shown in FIG. 7.

FIG. 14 is a scatter diagram of energy values obtained by the least-square fitting algorithm vs. energy values obtained by the digital gated integration, and the energy values are as shown in FIG. 7. A horizontal coordinate in the scatter diagram represents an energy value obtained by the gated integration and a vertical coordinate in the scatter diagram represents an energy value obtained by the method according to the present disclosure.

Figure 15:
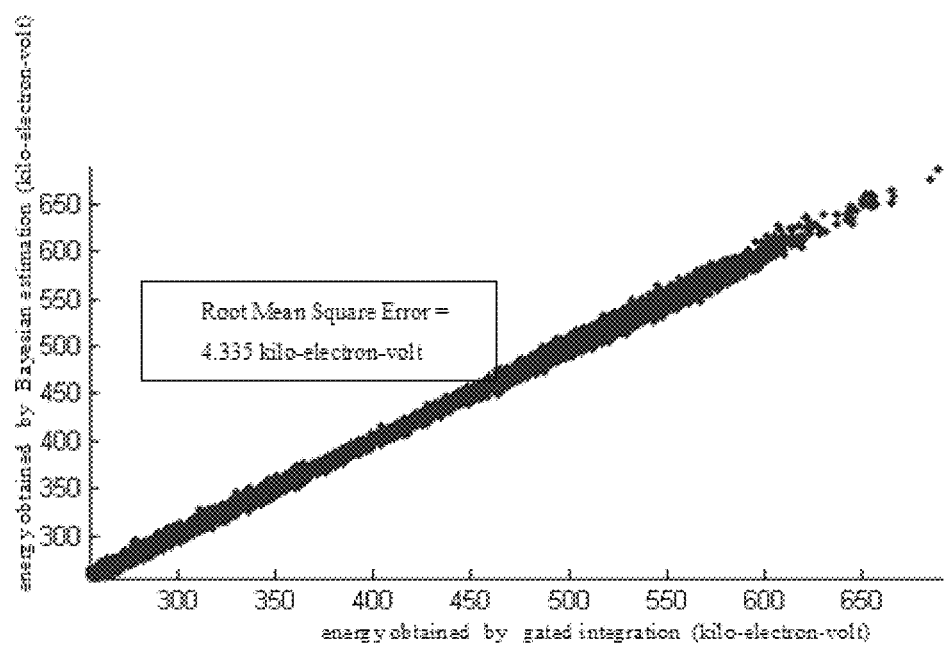
FIG. 15 is a scatter diagram of energy values obtained by a method according to the present disclosure vs. energy values obtained by digital gated integration, in which the energy values are as shown in FIG. 7.

FIG. 15 is a scatter diagram of energy values obtained by the method according to the present disclosure vs. energy values obtained by the digital gated integration, and the energy values are as shown in FIG. 7. A horizontal coordinate in the scatter diagram represents an energy value obtained by the gated integration, and a vertical coordinate in the scatter diagram represents an energy value obtained by the method according to the present disclosure.

It can be seen from energy spectrum diagrams as shown in FIG. 6 to FIG. 11 that, the energy resolution obtained by the method according to the present disclosure is better than that obtained by the conventional pulse fitting method, and the method according to the present disclosure facilitates rejection of a scattering event. And it can be seen from scatter diagrams as shown in FIG. 12 to FIG. 15 that, the method according to the present disclosure has higher accuracy and a smaller error, and is more suitable for estimating a height of a pulse and for designing some position-sensitive detector. The searching process shown in FIG. 16 is a process for reducing an energy range defined in the method according to the present disclosure, which is shown in the schematic diagram as that the range is shrunk by 0.618 times each time.

With the method and system for recovering scintillation pulse information, system energy calculation accuracy is improved effectively. The method and the system are especially suitable for calculating energy by a sparse quantization level ADC digital nuclear instrument.

As shown in FIG. 1, a system for recovering scintillation pulse information according to the present disclosure includes a noise model module 100, a posterior probability module 200 and an energy value search module 300. The noise model module 100 is configured to train pre-acquired data having a low count rate to obtain a noise model of a scintillation detector system. The posterior probability module 200 is configured to calculate a posterior probability to obtain a posterior probability logarithm value for a given energy value. And the energy value search module 300 is configured to search for an energy value meeting a maximal posterior probability condition.

As further shown in FIG. 1, the noise model module 100 is configured to train the pre-acquired data to obtain an average pulse, a noise variance and a noise distribution skewness. And the noise model is provided to the module 200.

The noise model module 100 may include three submodules, i.e., an average pulse module 110, a pulse noise module 120 and a probability density distribution module 130. The average pulse module 110 is configured to calculate an average pulse of single events. The pulse noise module 120 is configured to calculate a noise variance of pulses of the single events. And the probability density distribution module 130 is configured to estimate a probability density distribution function of noise.

The posterior probability module 200 is configured to calculate a posterior probability logarithm value for a given energy value.

The posterior probability module 200 may include two sub-modules, i.e., a likelihood function distribution module 210 and a time point product module 220. The likelihood function distribution module 210 is configured to calculate a value of a likelihood function for each point based on the given energy value and the pulse noise model inputted by the module 100. And the time point product module 220 is configured to calculate a posterior probability logarithm value.

The energy value search module 300 is configured to calculate an energy value meeting a maximal posterior probability condition.

The energy value search module 300 may include three sub-modules, i.e., a tentative energy calculation module 310, a linear search module 320 and a time origin correction module 330. The tentative energy calculation module 310 is configured to calculate a posterior probability logarithm value for a tentative energy value by calling the module 200. The linear search module 320 is configured to calculate an energy value meeting the maximal posterior probability condition with a linear search algorithm. And the time origin correction module 330 is configured to correct a time origin of a sample and call the module 310 and the module 320 repeatedly.

Figure 5:
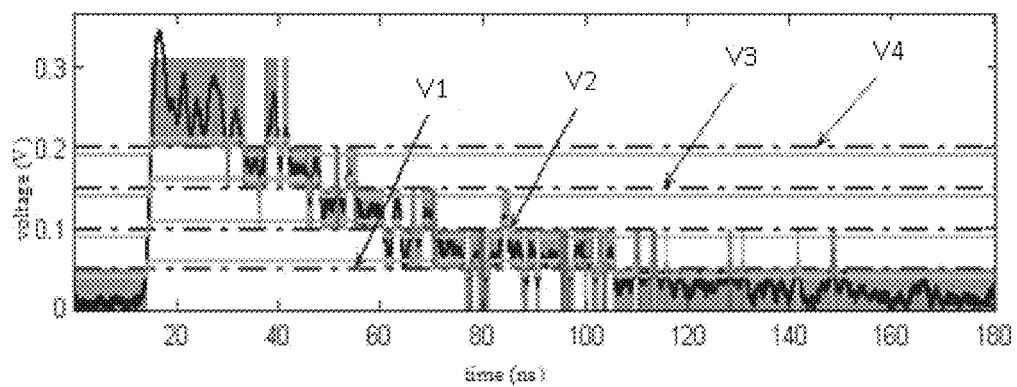
FIG. 5 shows digitization results of the scintillation pulse shown in FIG. 3 under an ADC with four thresholds.
Figure 17:
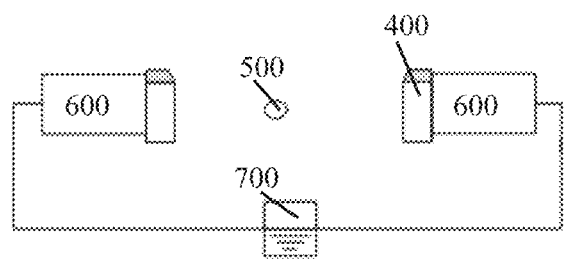
FIG. 17 is a schematic diagram of a typical system according to the present disclosure.
Figure 18:
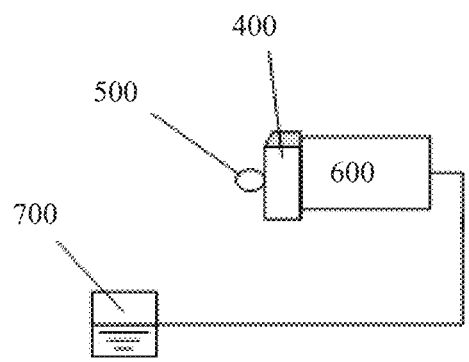
FIG. 18 is a schematic diagram of another typical system according to the present disclosure.

Reference is made to FIG. 3 to FIG. 5. FIG. 3 is a schematic diagram of a typical scintillation pulse according to the present disclosure, FIG. 4 is a schematic diagram of a set of scintillation pulses having same energy, and FIG. 5 shows digitization results of the scintillation pulse shown in FIG. 3 under an ADC having four thresholds. In FIG. 5, V1, V2, V3 and V4 represent reference voltages 1, 2, 3, 4, respectively. Reference is made to FIG. 17 and FIG. 18. FIG. 17 is a schematic diagram of a typical system with a compliance working mode according to the present disclosure, and FIG. 18 is a schematic diagram of another typical system with single channel working mode according to the present disclosure. In FIGS. 17 and 18, a scintillation pulse is represented as 400, a radiation source is represented as 500, a photomultiplier tube is represented as 600 and a digital oscilloscope is represented as 700. The method and the system for recovering scintillation pulse information according to the present disclosure are described in detail with several embodiments in conjunction with FIGS. 3 to 5 and FIGS. 17 and 18. In the method and the system for recovering the scintillation pulse according to the present disclosure, involved parameters and filter designing are adjusted based on a feature of the pre-acquired data, to achieve a good energy resolution performance and a short pulse duration. In the following, parameters for processing data in related application embodiments are listed.

First Embodiment

In the following, parameters for processing data according to the embodiment are listed.

An actual system adopted in step S1 includes an LYSO crystal and a Hamamatsu R9800 PMT. The crystal has a size of 16.5 mm×16.5 mm×10.0 mm. A coupling surface between the crystal and the PMT is the 100 surface, and surfaces other than the coupling surface are packaged with a Teflon adhesive tape. A data acquisition system has a sapling rate of 50 GHz and a bandwidth of 16 GHz. As shown in FIG. 10, a radiation source includes positron annihilation gamma photons of 511 kev, an average pulse rising time duration is about 2 ns, and a time constant is 42.5497 ns after an exponential fitting is performed on a falling edge.

$\Delta t$ adopted in step 2.1 is 200 ns.

Second Embodiment

In the following, parameters for processing data according to the embodiment are listed.

As shown in FIG. 11, an actual system adopted in step S1 includes an LYSO crystal and an FM300035 SIPM. The crystal has a size of 2.0 mm×2.0 mm×10.0 mm. A coupling surface between the crystal and the PMT is the 100 surface, and surfaces other than the coupling surface are packaged with a Teflon adhesive tape. A data acquisition system has a sampling rate of 50 GHz and a bandwidth of 16 GHz. As shown in FIG. 10, a radiation source includes positron annihilation gamma photons of 511 kev and an average pulse rising time duration is about 5 ns.

$\Delta t$ adopted in step 2.1 is 300 ns.

Third Embodiment

In the following, parameters for processing data according to the embodiment are listed.

An actual system adopted in step S1 includes an LaBr crystal and an Hamamatsu R9800 PMT. The crystal has a size of 3.5 mm×3.5 mm×5.0 mm. A coupling surface between the crystal and the PMT is the 100 surface, and surfaces other than the coupling surface are sealed with metal. A data acquisition system has a sampling rate of 50 GHz and a bandwidth of 16 GHz. As shown in FIG. 10, a radiation source includes positron annihilation gamma photons of 511 kev and an average pulse rising time duration is about 2 ns.

$\Delta t$ adopted in step 2.1 is 100 ns.

The method and the system for recovering scintillation pulse information according to the present disclosure may be applied to a nuclear detection instrument, a nuclear analysis instrument and a nuclear medical instrument, in which a signal is required to be digitized directly.

It will be apparent to those skilled in the art that the present disclosure is not limited to the details of the foregoing illustrative embodiments, and that the present disclosure may be embodied in other specific forms without departing from the spirit or essential features of the present disclosure. Therefore, the illustrated embodiments should be considered in all respects as illustrative and not restrictive. The scope of the present disclosure is defined by the appended claims rather than by the foregoing description, and therefore includes all changes which come within the meaning and range of equivalency of the claims. And the reference signs in the claims should not be construed as limiting the claim concerned.

In addition, it should be understood that, the specification is described based on the embodiments, but it is not intended that each embodiment only includes one independent technical solution. Such description manner of the specification is only for clarity. The specification should be considered as a whole by those skilled in the art, and the technical solutions of the embodiments may be combined appropriately to form other embodiments which can be understood by those skilled in the art.

The invention claimed is:

1. A method for recovering scintillation pulse information, implemented by a PET or a nuclear measurement apparatus which comprises a detector, wherein the method comprises:

step S1: acquiring, by the detector, a scintillation pulse database of non-stacked compliance single events in a low count, and building a scintillation pulse noise model for the scintillation pulse database of the single events by a simulation or experimental measurement, wherein an average pulse is calculated for the scintillation pulse database of the non-stacked compliance single events, and scintillation pulse shape information is given by the average pulse, and wherein the detector comprises an LYSO crystal and a Hamamatsu R9800 PMT, an LYSO crystal and an FM300035 SIPM, or an LaBr crystal and an Hamamatsu R9800 PMT;

step S2: calculating a posterior probability logarithm value for a given energy value based on the scintillation pulse noise model, comprising:

step 2.1: loading a scintillation pulse segment $S_0$, and calculating a likelihood function of the given energy value based on the pulse noise model, wherein the scintillation pulse segment starts at a time point $t_0$ at which the scintillation pulse segment passes upwards a threshold $v_1$, and the scintillation pulse segment ends at a time point $t_0+\Delta t$, with $\Delta t$ being greater than two times of a time constant of a falling edge of a scintillation crystal; and step 2.2: calculating logarithms for all of the time points and adding up the logarithms, to obtain a value of a function having same monotonicity as a posterior probability function; and step S3: performing step S2 repeatedly to obtain an energy value meeting a maximal posterior probability condition, comprising:

step 3.1: calculating posterior probabilities for different tentative energy values by repeatedly performing step S2 as a module;

step 3.2: searching linearly for the energy value meeting the maximal posterior probability condition; and step 3.3: after the energy value is obtained, correcting a time origin for step 2.1 based on the energy value and repeating step 3.1 and step 3.2;

step S4: obtaining an energy spectrum with an improved energy resolution according to the energy value obtained from step S3.

2. The method for recovering scintillation pulse information according to claim 1, wherein the scintillation pulse database in step S1 comprises 2000 or more samples.

3. The method for recovering scintillation pulse information according to claim 1, wherein the scintillation pulse noise model in step S1 comprises characteristics of a scintillation pulse shape, a scintillation pulse height and a scintillation pulse noise level.

4. The method for recovering scintillation pulse information according to claim 1, wherein the calculating the average pulse in step S1 comprises:

step 1.1: reducing a radiation dose of a radiation source to obtain a weak source, and reducing the number of high-energy photons captured by a detector by the weak source or by adjusting a solid angle of the weak source with respect to the detector, wherein an event received by the detector is a Poisson stream having an average count rate expressed as $$R = \overset{n}{\underset{i}{a}} m_i q_i \qquad (1)$$

where $m_i$ and $q_i$ denotes respectively a dose of the weak source and a solid angle of the weak source with respect to the detector, i denotes an index of the weak source, and n denotes the number of weak sources;

step 1.2: aligning the pulses with a constant coefficient identification method or a leading edge discrimination method; and step 1.3: averaging the aligned pulses.

5. The method for recovering scintillation pulse information according to claim 4, wherein, in step S1, after the pulses are aligned, energy values of scintillation pulses corresponding to a same energy value at a same time point are distributed dispersedly, the distribution is defined as a noise model of the pulses, and a parameter of the noise model is used to calculate a posterior probability value for a given energy value.

6. The method for recovering scintillation pulse information according to claim 1, wherein step S1 further comprises:

setting a couple of compliance pulses selected within an energy range as a couple of single events, and pre-storing and then analyzing off-line such digitized electric pulses, wherein an average pulse signal is obtained by aligning the couple of pulses, and energy spectrums of the single events are obtained by adding up the digitized electric pulses by taking the average pulse as a system response.

7. The system for recovering scintillation pulse information according to claim 1, wherein the system is further configured to: calculate a likelihood function value of each point based on the given energy value and the pulse noise model input by the fluctuation model module; and calculate a posterior probability logarithm value.

8. The system for recovering scintillation pulse information according to claim 1, wherein the system is further configured to: calculate a posterior probability logarithm value for a tentative energy value by calling the posterior probability module;

calculate an energy value meeting a maximal posterior probability condition with a linear search algorithm; and correct a time origin for a sample and repeatedly call the tentative energy calculation module and the linear search module.

9. A system for recovering scintillation pulse information, comprising a detector comprising an LYSO crystal and a Hamamatsu R9800 PMT, an LYSO crystal and an FM300035 SIPM, or an LaBr crystal and an Hamamatsu R9800 PMT and configured to acquire a scintillation pulse database of non-stacked compliance single events in a low count, and wherein the system is configured to:

build a scintillation pulse noise model for the scintillation pulse database of the single events by a simulation or experimental measurement, wherein an average pulse is calculated for the scintillation pulse database of the non-stacked compliance single events, and scintillation pulse shape information is given by the average pulse;

calculate a posterior probability to obtain a posterior probability logarithm value for a given energy value based on the scintillation pulse noise model;

search for an energy value meeting a maximal posterior probability condition; and obtain an energy spectrum with an improved energy resolution according to the searched energy value.

10. The system for recovering scintillation pulse information according to claim 9, wherein the system is further configured to:

calculate an average pulse of single events;
calculate a noise variance of pulses of the single events; and
estimate a probability density distribution function of noise.

* * * * *